United States Patent [19]

Fengler

[11] Patent Number: 4,802,801
[45] Date of Patent: Feb. 7, 1989

[54] WORKTABLE SUPPORT FOR MACHINE TOOL

[76] Inventor: Wolfram F. O. Fengler, 16721 Chaparral, Cerritos, Calif. 90701

[21] Appl. No.: 117,575
[22] Filed: Nov. 6, 1987
[51] Int. Cl.⁴ .............................................. B23C 1/14
[52] U.S. Cl. .................................. 409/168; 409/233
[58] Field of Search .............. 409/168, 219, 233, 131, 409/31, 80

[56] References Cited

U.S. PATENT DOCUMENTS

| | | | |
|---|---|---|---|
| 2,891,452 | 6/1959 | Zwick et al. | 409/168 |
| 3,657,963 | 4/1972 | Miller | 409/168 |
| 4,242,019 | 12/1980 | Roch | 409/233 |

Primary Examiner—Leon Scott, Jr.
Attorney, Agent, or Firm—Jack C. Munro

[57] ABSTRACT

A typical machine tool utilizes a horizontally disposed, elongated, substantially planar worktable which is supported by a knee between the ends of the worktable. When a workpiece is placed on the worktable and the worktable is moved relative to the knee in performing of the machining operations, the outer ends of the worktable will slightly sag. The structure of this invention is for a support apparatus to slightly raise the ends of the worktable so that the planar operating surface of the worktable is accurately maintained horizontal along the entire longitudinal length of the worktable.

4 Claims, 2 Drawing Sheets

WORKTABLE SUPPORT FOR MACHINE TOOL

BACKGROUND OF THE INVENTION

The field of this invention relates to machine tool equipment and more particularly to a support apparatus for the worktable of the machine tool to support the worktable so that the operating planar surface of the worktable is located precisely within a given horizontal plane.

Machine tools are in exceedingly common usage. The typical construction of a machine tool utilizes a tool supporting column which is positioned is a spaced relationship above a worktable. This worktable is mounted on a knee. The worktable is movable along an X, Y and Z axis. Also, the machine tool itself is to be movable along the vertical axis (Z-axis) toward and away from the worktable.

A substantial amount of machining operations require accuracy to several thousandths of an inch. Even though the worktable is constructed of a solid, rigid piece of metal, this worktable will have a tendency to sag slightly at its ends since it is supported at a single point of connection located intermediate the ends. In essence, each end of the worktable is cantilevered with respect to the center of the worktable. When the workpiece, which frequently constitutes a rather heavy-weighted object, is placed on the table, further sagging occurs. Now when it is desired to create a machining operation within a certain tolerance of a few thousandths of an inch, this sagging of the worktable absolutely prevents such a tolerance being obtained.

SUMMARY OF THE INVENTION

Previous to the present invention, there has not been known to the inventor of the subject invention any device which could be mounted in conjunction with the machine tool to compensate for the sagging ends of the worktable to maintain the operating surface of the worktable exceedingly accurate within a single horizontal plane.

The apparatus of the present invention includes a pair of arms with one arm to connect with one end of the worktable and the other arm to connect with the other end of the worktable. Each arm is to be connected to an actuator assembly and through this actuator assembly a counterforce is to be supplied to the worktable to compensate for the cantilevered weight of the table itself and the workpiece mounted on the table. As the worktable is moved, this apparatus is designed to maintain the application of this force and to not interfere with the movement of the worktable. The apparatus of this invention is to be applied to an existing machine tool on an after market basis.

DETAILED DESCRIPTION OF THE SHOWN EMBODIMENT

Figure 1:
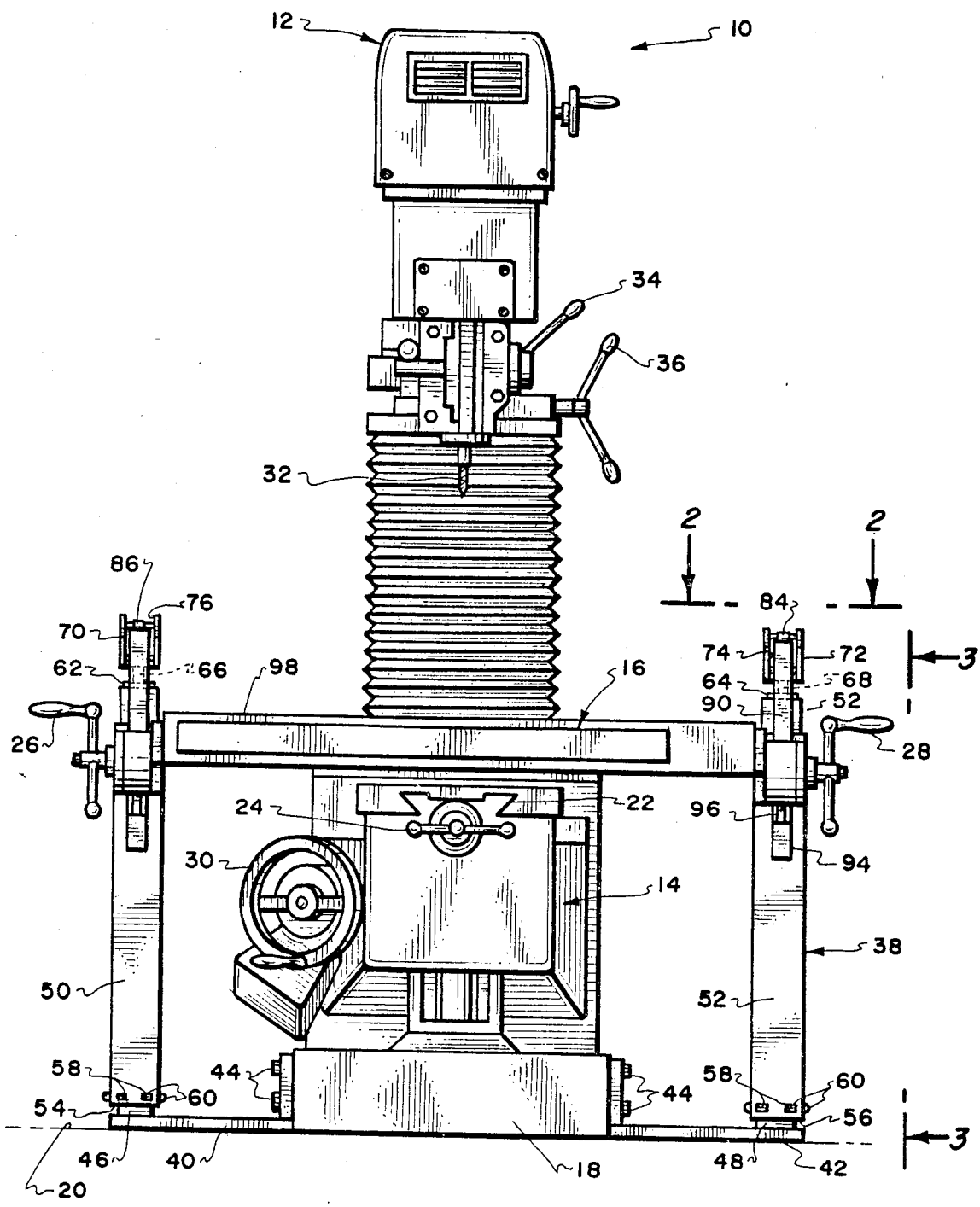
FIG. 1 is a front view of a typical machine tool upon which has been mounted the support apparatus of the present invention.
Figure 2:
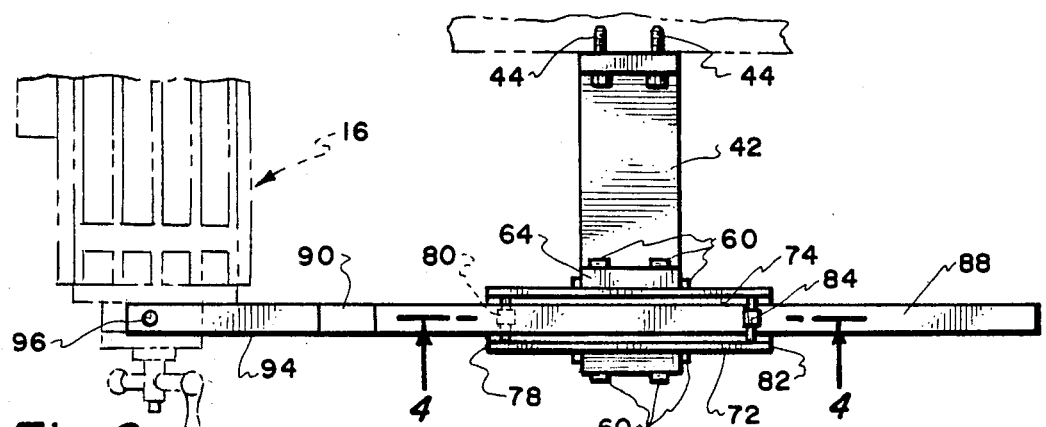
FIG. 2 is a top plan view of a portion of the support apparatus of the present invention taken along line 2—2 of FIG. 1.
Figure 3:
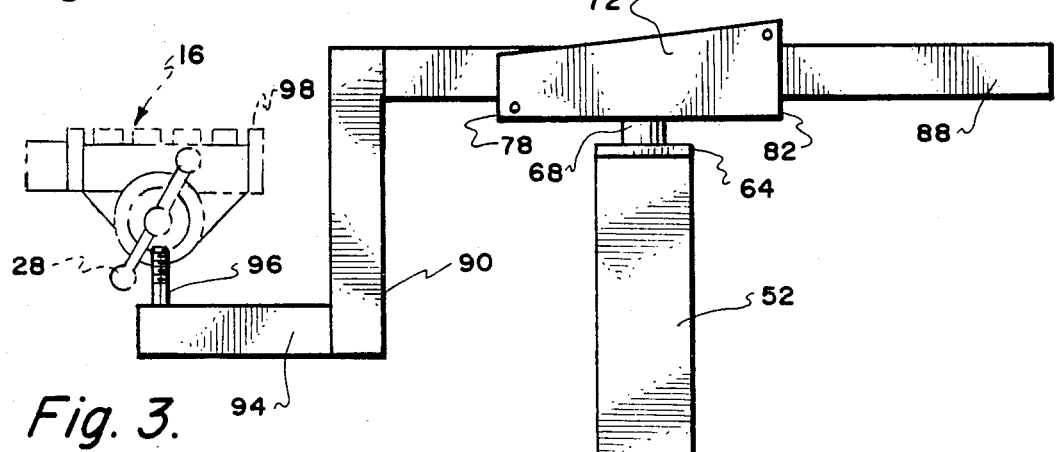
FIG. 3 is a side view of the support apparatus of this invention taken along line 3—3 of FIG. 1.
Figure 4:
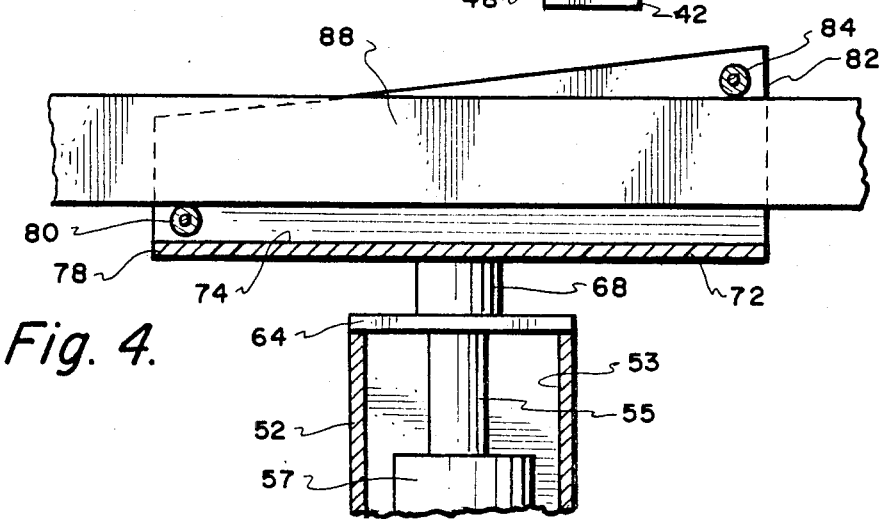
FIG. 4 is a side cross-sectional view of a portion of the support apparatus of this invention taken along line 4—4 of FIG. 2.

Referring particularly to the drawings, there is depicted within FIG. 1 a machine tool in the form of a milling machine 10 which is constructed of a vertical column 12, a knee 14 and a workpiece supporting worktable 16. The knee 14 is mounted on a base 18. The base 18 is supported on a supporting surface such as a floor 20 of a building. The lower end of the vertical column 12 is also mounted on the base 18.

The worktable 16 is to be movable relative to the column 12 along the Y-axis through the dovetail slot arrangement 22. This movement of the table 16 is to occur by manual turning of handle 24. Movement of the worktable 16 along the X-axis (perpendicular to the Y-axis) is to occur by manual turning of either handle 26 or 28. The X-axis and the Y-axis form a horizontal plane. Movement of the worktable 16 along the Z-axis (perpendicular to both the X-axis and the Y-axis) is accomplished by manual turning of handle 30.

Mounted on the Z-axis is a machine tool 32. A typical machine tool would be a milling bit. The tool 32 is to be movable toward and away from the worktable 16 along the Z-axis. This movement is to occur manually by turning of handle 34. The machine tool 32 is also movable along the Y-axis by turning of handle 36. It is to be understood that what has been described up to this point constitutes no more then a conventional milling machine.

It is typical, when utilizing the machine tool of this invention, that with the worktable 16 moved along the X-axis either totally to the right or totally to the left within FIG. 1 of the drawings, there will result in the production of an inaccuracy of two or more thousandths of an inch within the workpiece (not shown) that is mounted on the worktable 16. It is to be understood that if the ends of the worktable 16 were supported so that the combined weight of the worktable and the workpiece is evenly divided between the knee 14 and the ends of the worktable 16, then this two thousandths inch deflection would not occur. The support apparatus 38 of the present invention is designed to compensate for this deflection so that it does not occur.

Support apparatus 38 includes a pair of mounting plates 40 and 42. Plates 40 and 42 are basically identical and mounted in a reversed relationship to each other with plate 40 being mounted on one side of base 18 with plate 42 being mounted on the opposite side of base 18. The plates 40 and 42 are fixedly mounted onto base 18 by means of conventional fasteners such as bolts 44.

Fixedly mounted onto mounting plate 40 is an upwardly extending member 46. A similar member 48 is fixedly mounted adjacent the outer extremity of the mounting plate 42. The members 46 and 48 will generally be of a height of a few inches from their respective mounting plate 40 or 42. Mounted on top of the members 46 and 48 is an actuator with only actuator 57 being shown for plate 42. This actuator 57 will normally be hydraulic but any desirable form of actuator 57 could be utilized such as pneumatic or the like. Operation of actuator 57 causes extension of rod 55. This actuator 57 is to be surrounded by a tube 50 from member 46 and tube 52 from member 48. Concerning tube 52 the actuator 57 is located within the internal chamber 53. The transverse cross-sectional configuration of the tubes 50 and 52 is square but it is considered to be within the scope of this invention that any desirable cross-sectional configuration could be utilized. The tube 50 is identical to tube 52.

It is to be understood that the tubes 50 and 52 are open at their respective bottom edges 54 and 56. Formed within the side wall of the tubes 50 and 52 and directly adjacent their bottom edge 54 and 56 are a series of openings 58. Rotatably supported within each opening 58 is a roller 60. These rollers 60 are to connect with the members 46 and 48. Therefore, low-frictional movement of tube 50 is to occur with respect to member 46 and between tube 52 and member 48.

The upper end of the tube 50 is closed by means of a cap plate 62. A similar cap plate 64 closes the upper end of tube 52. The actuator rod 55 abuts against the cap plate 64. In a similar manner, the rod of the actuator mounted within the tube 50 is to abut against the cap plate 62. It is to be understood that by actuating of the actuators from a source (not shown) that pressure is supplied against the cap plates 62 and 64 which will cause longitudinal movement of their respective tubes 50 and 52 relative to the members 46 and 48.

Mounted on cap plate 62 is a plug 66. A similar plug 68 is mounted on cap plate 64. Mounted on plug 66 is a cradle 70 with a similar cradle 72 being fixedly mounted onto the plug 68. Each of the cradles 70 and 72 are identical and the discussion regarding cradle 72 is to be understood to be applicable to cradle 70.

Cradle 72 is basically U-shaped having an open top defining an elongated recess 74. A similar recess 76 is formed within the cradle 70. Mounted within the recess 74 adjacent its forward edge 78 is a roller 80. Also located within the recess 74 adjacent the rearward edge 82 of the cradle 72 is a roller 84. A similar roller 86 is mounted in conjunction with the cradle 70. The aft end 88 of a support arm is located within the recess 74 with the lower edge of the aft end 88 resting on roller 80 and the upper edge of aft end 88 resting against roller 84. It can thus be seen that the aft end 88 is capable of lineal movement relative to the cradle 72 with this lineal movement occurring low-frictionally due to rollers 80 and 84. It is to be noted that the actual extend of movement of the aft end 88 would generally be no more than a few inches.

The forward edge of the aft end 88 is integrally mounted to a vertical section 90 of the support arm. A similar vertical section 92 is included within the support arm that is mounted within the recess 76 of the cradle 70. The lower end of the vertical section 90 is fixedly mounted to a fore end 94 of the support arm. Mounted on the fore arm 94 is an upright pin 96. This piin 96 is threadably engaged with the worktable 16. It is to be noted that this threaded engagement is loose thereby permitting slight pivoting of the pin 96 relative to the worktable 16. However, vertical movement (Z-axis) is prevented between the worktable 16 and the pin 96.

The operation of this support apparatus 38 of this invention is as follows: Let it be assumed that the worktable 16 weighs one hundred pounds. Let it further be assumed that a workpiece (not shown) is mounted on the worktable 16 and that workpiece weighs two hundred pounds. Let it further be assumed that the worktable 16 is moved as far right as possible when observing FIG. 1. Without the apparatus 38 of this invention, the total three hundred pound weight is supported by the knee 14 and there will be a few thoudsandths of an inch sagging occurring at the rightmost section of the worktable 16. In order to compensate for this, there will be applied a certain upward force by the actuator 57 which slightly moves the cradle 72 in an upward direction. As a result, the fore section 94 is raised as well as pin 96 and its respective end of the worktable 16. This amount of force will be dependent upon the amount of cantilevering of this portion of the worktable 16. Typically, in this particular situation, possibly one hundred fifty pounds of force would be required at the right edge of the worktable 16 with only fifty pounds of force being required at the left edge of the worktable 16 by the actuator located within tube 50. The remaining amount of force, that is one hundred pounds, will be transferred through the knee 14.

It is to be understood that the amount of force will be predetermined through the use of a sensing arrangement (not shown) so that the operating surface 98 of the worktable 16 will be maintained precisely horizontal. This sensing arrangement can be accomplished by various means such as a strain gauge assembly (not shown). As the worktable 16 is moved along the X-axis during the normal machining operation in conjunction with the milling tool 32, the force at one end of the worktable 16 will be decreased and with the amount of force at the opposite end of the worktable 16 would be increased. As the worktable 16 moves along the X-axis, the aft end 88 of each of the support arms will lineally move relative to their respective cradles 70 and 72. Also, it is to be understood that cradles 70 and 72 will pivot relative to their respective tubes 50 and 52.

It is also to be understood that if it is desirable to move the worktable 16 along the Y-axis that lineal movement will also occur within the respective cradles 70 and 72 by the aft ends 88. It is also to be understood that during movement of the worktable 16 along the Z-axis, that the actuators located within the tubes 50 and 52 will be actuated to adjust with this movement.

It is to be understood that each of the support arms will be maintained parallel with respect to each other. Both new and old machine tools such as milling machines become highly accurate. Exceedingly heavy weighted workpieces can be put on the worktable without fear of causing any inaccuracy. Also, during the movement of the worktable 16 along the X and Y axes during the machining operation, the operating surface is maintained precisely horizontal, the movement of the worktable 16 will not vary and will be constant which is difficult to precisely obtain when the worktable has assumed a slightly bowed configuration. Also, the support apparatus 38 of this invention minimizes the amount of wear of the machine tool by decreasing the amount of weight being applied to the knee 14.

What is claimed is:

1. In combination with a machine tool having a tool supporting column and a horizontal worktable, said tool supporting column being movable toward and away from said worktable, a floor mounted base, said tool supporting column being mounted on said base, a knee, said worktable being movably mounted on said knee, said worktable having longitudinal spaced apart ends, said ends being cantilevered relative to said knee, said knee being mounted on said base, the improvement comprising:

a support apparatus for said worktable, said support apparatus including a pair of arms, each said arm having an outer end, a said outer end connecting by connection means with a said end of said worktable; and arm support means composed of a pair of actuating cylinder arrangements, therebeing a said actuating arrangement for each said arm, a said actuating cylinder arrangement connecting with a said arm and being for the purpose of raising and lowering its respective said arm, whereby each said actuating cylinder arrangement is to slightly raise its respective said end of said worktable and orient such precisely in horizontal alignment with the portion of said worktable located directly above said knee.

2. The combination as defined in claim 1 wherein:

said connection means comprising a pin and socket arrangement for each said arm.

3. A support apparatus with the ends of a centrally supported worktable of a machine tool, said worktable being horizontally movable, said support apparatus comprising:

a pair of arms, each said arm having an outer end, a said outer end connected by connection means with a said end of said worktable; and arm support means composed of a pair of actuating cylinder arrangements, therebeing a said actuating cylinder arrangement for each said arm, a said actuating cylinder arrangement connecting with a said arm and being for the purpose of raising and lowering its respective said arm, whereby each said actuating cylinder arrangement is to slightly raise its respective said end of said worktable and orient such precisely in horizontal alignment with the center portion of said worktable.

4. The combination as defined in claim 3 wherein:

said connection means comprising a pin and socket arrangement for each said arm.

* * * * *